United States Patent [19]

Hunter, Jr.

[11] Patent Number: 4,559,659
[45] Date of Patent: Dec. 24, 1985

[54] POWER OPERATED WHEELCHAIR RAMP

[75] Inventor: Kelvin H. Hunter, Jr., Fairfax, Va.

[73] Assignee: Paralyzed Veterans of America, Washington, D.C.

[21] Appl. No.: 575,674

[22] Filed: Jan. 31, 1984

[51] Int. Cl.<sup>4</sup> .............................................. E01D 1/00
[52] U.S. Cl. ...................... 14/71.3; 14/69.5; 105/436
[58] Field of Search ............... 14/71.1, 71.3, 71.5, 14/71.7; 105/436; 119/82; 187/19; 280/164 A

[56] References Cited

U.S. PATENT DOCUMENTS

| | | | |
|---|---|---|---|
| 3,500,486 | 3/1970 | Le Clear | 14/71.3 |
| 3,628,209 | 12/1971 | Parent | 14/71.1 |
| 3,882,563 | 5/1975 | Smith et al. | 14/71.3 |
| 3,894,515 | 7/1975 | Plyler | 119/82 |
| 3,936,898 | 2/1976 | Poe | 14/69.5 |
| 4,084,713 | 4/1978 | Rohrs et al. | 14/69.5 |

FOREIGN PATENT DOCUMENTS

| | | | |
|---|---|---|---|
| 532242 | 10/1954 | Belgium | 14/71.1 |
| 1228017 | 9/1957 | France | 14/71.1 |

Primary Examiner—James A. Leppink
Assistant Examiner—John F. Letchford
Attorney, Agent, or Firm—Fleit, Jacobson, Cohn & Price

[57] ABSTRACT

A wheelchair ramp that is recessed in a sidewalk and adapted for elevation to an inclined position to provide a ramp between a step or a transit vehicle and the sidewalk. The plate includes an upwardly extending lip along its forwardmost surface adjacent to the step, and the step includes a downwardly extending, lip-receiving recess to limit upward movement of the plate and to restrain it in position relative to the step. The plate can be elevated by means of a rack and gear arrangement operated by an electric motor controlled by a suitable switch, which can be a remote control switch.

10 Claims, 6 Drawing Figures

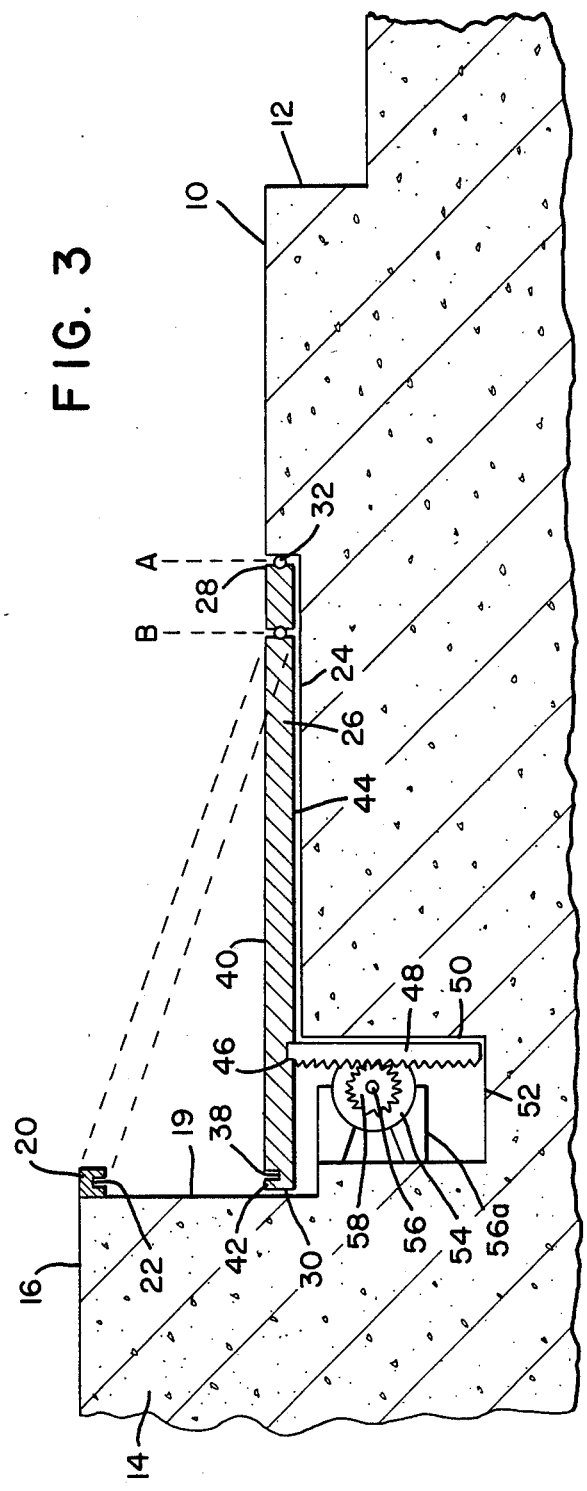

POWER OPERATED WHEELCHAIR RAMP

BACKGROUND OF THE INVENTION

1. Field of the Invention

This invention relates to wheelchair ramps, and, more particularly, to a powered wheelchair ramp that can be placed on a surface and that is adapted to be pivoted at one end to engage with a step to facilitate wheelchair passage over the step, or used to facilitate wheelchair boarding of a means of transportation such as a bus, streetcar, railway car or commuter rail car.

2. Description of the Prior Art

In recent years there has been a greater recognition that access to public facilities and transit systems by those confined to wheelchairs is rendered difficult by the presence of curbs, steps, and the like. As a result, various regulations have been adopted to require that ramps be provided at curbs at intersections, that ramps be provided for access to public buildings, that buses be equipped with lifts, and that transit authorities purchase rail cars with access equipment, and the like, to facilitate such access.

In order to facilitate movement by those confined to wheelchairs, various devices have been developed. For example, in U.S. Pat. No. 3,936,898, that issued Feb. 10, 1976, there is disclosed a portable ramp for wheelchairs in the form of a pair of rectangular plates that are hingedly connected along a pair of longer edges. The ramp includes a pair of tubular legs adjacent to the corners of one side to permit the ramp to be placed in an inclined position, to thereby permit a wheelchair to travel from a first level to a second level by means of the ramp, which is positioned adjacent to a step.

A power operated ramp is disclosed in U.S. Pat. No. 4,084,713, that issued Apr. 18, 1978, the ramp being secured to a vehicle and capable of folding for easy storage. One end of the ramp is hingedly secured to the floor of the vehicle, and the ramp unfolds outwardly so that the free end contacts the ground. The ramp defines a flat, inclined surface to permit the wheelchair and occupant to enter and leave the vehicle without the need for traversing steps.

In addition to the provision of wheelchair ramps, the prior art also discloses movable ramps used in connection with loading and unloading facilities for trucks. Examples of such patents are U.S. Pat. Nos. 3,500,486, that issued on Mar. 17, 1970; 3,882,563 that issued on May 13, 1975; and 3,894,515, that issued on July 15, 1975. A similar arrangement is illustrated and described in U.S. Pat. No. 3,628,209, that issued on Dec. 21, 1971, and that shows a device for connecting with an access surface several superposed levels of a structure.

Although the prior art discloses various types of ramp constructions for various uses, the disclosed ramps that are power operated are somewhat complicated and cumbersome, and the portable ramps are inconvenient to use. Therefore, there is a need for a simplified ramp construction that is permanently placed adjacent to a step or transit vehicle boarding site and that can be power operated to cause the ramp to extend between the upper and lower surfaces and thereby permit unimpeded travel by one confined to a wheelchair. It is therefore an object of the present invention to provide such an arrangement.

SUMMARY OF THE INVENTION

Briefly stated, in accordance with one aspect of the present invention, a pivotable wheelchair ramp is provided to permit travel between a lower level and an upper level separated by at least one step. The ramp includes a generally rectangular plate including pivot means at one end to define a pivot axis, and an upwardly facing lip at the opposite end. The upper edge of the upper level or step includes a lip receiving means that is engagable with the lip on the plate. Means are provided to pivot the plate about the pivot access between a first position at the lower level to a second position in which the plate is inclined relative to the first position, and the end of the plate that carries the lift is adjacent to the upper level with the lip engaging the lip receiving means to prevent pivoting of the plate beyond the second level.

BRIEF DESCRIPTION OF THE DRAWINGS

FIG. 3 is a fragmentary, cross-sectional view of another form of a powered wheelchair ramp in accordance with the present invention.

FIG. 4 is a fragmentary, cross-sectional view showing a portion of a guide channel that guides the movement of one end of the wheelchair ramp of FIG. 3.

DESCRIPTION OF THE PREFERRED EMBODIMENTS

Figure 1:
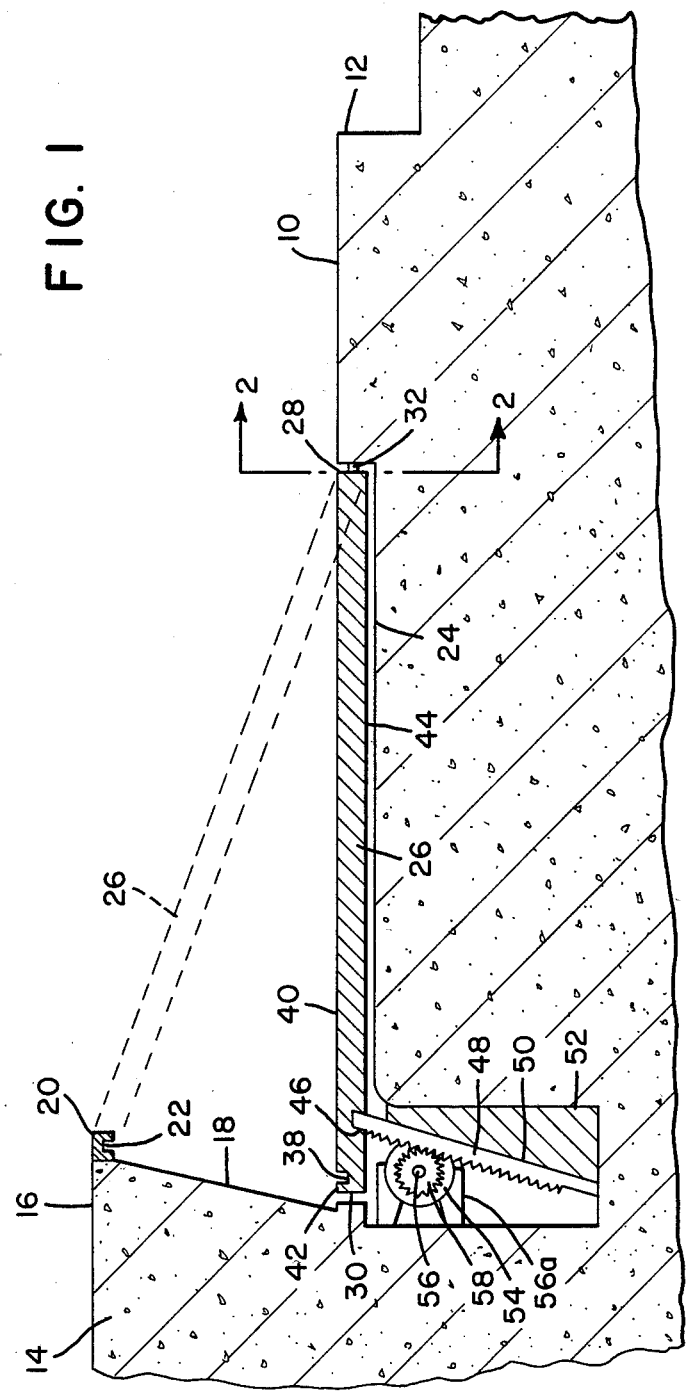
FIG. 1 is a fragmentary, cross-sectional view of a powered wheelchair ramp in accordance with the present invention.

Referring now to the drawings, and particularly to FIG. 1 thereof, there is shown a portion of a sidewalk 10 that extends from a curb 12 to a step 14. The step can be, for example, at the entry to a building and includes a flat top surface 16 and a downwardly and inwardly sloping riser 18. At its upper edge defined by the intersection of the top surface and the riser, step 14 includes an elongated channel 20, or the like, that extends completely across step 14 and is flush with top surface 16. Channel 20 is of a generally U-shaped configuration and has a longitudinally oriented slot 22 that extends along the width of step 14 and faces in a downward direction to define a downwardly extending, elongated opening.

Figure 2:
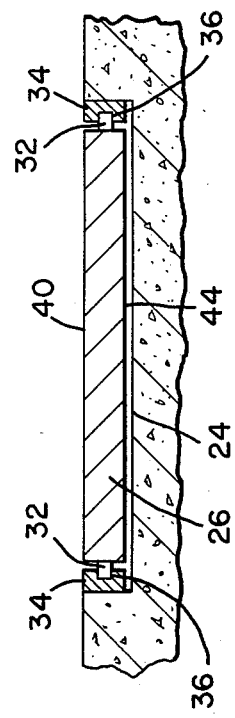
FIG. 2 is a fragmentary, cross-sectional view taken along the line 2—2 FIG. 1.

A generally rectangular recess 24 is provided in sidewalk 10 adjacent to and extending forwardly of step 14 in order to receive a generally rectangular plate 26. Preferably, the recess is of a depth to correspond with the thickness of plate 26 in order to provide a substantially level surface across the entire width of the sidewalk. The longer dimension of recess 24 and of plate 26 extends in a direction that is generally perpendicular to step 14. Plate 26 includes a rear edge 28 and a front edge 30. A pivot is provided at rear edge 28 in the form of a shaft 32 that can be welded to the rear edge of plate 26 and that extends outwardly beyond the respective side edges thereof. Alternatively, a pair of outwardly extending stub shafts (not shown) can be provided in the rearmost portions of each of the side edges of plate 26 to extend from the side edges of the plate adjacent to the rear edge. As best seen in FIG. 2, shaft 32, or the stub shafts, as the case may be, are rotatably received in respective retainers 34 that are secured to the respective side edges of recess 24 in the sidewalk. Thus, plate 26 is pivotably secured in retainers 34 that include circular recesses 36 to function as bearings to rotatably receive the ends of shaft 32.

Referring once again to FIG. 1, front edge 30 of plate 26 includes an upwardly facing groove 38 on its upper surface 40 to define an upwardly extending lip 42 between groove 38 and front edge 30 of plate 26. The lower surface 44 of plate 26 includes a recess 46, or the like, to receive one end of a rack 48 that is slidably retained in an inclined slot 50 that, in turn, is rigidly secured to the wall of a cavity 52 extending below recess 24 adjacent the lowermost edge of riser 18 and the forward portion of recess 24. Also secured to a wall of cavity 52 is an electric motor 54, or the like, that has a drive shaft 56 and a drive pinion 58 that is keyed to drive shaft 56 and that engages with rack 48. The motor is suitably connected to a source of electric power (not shown) by means of a manually operated switch (not shown) that can be key operated, if desired, and can be placed in a convenient position in the vicinity of the step. Alternatively, the switch can be remotely operated by a suitable remote control device of a type well known to those skilled in the art.

Plate 26 is made from a rigid material, such as, for example, ⅜ inch thick steel sheet, and preferably includes a high friction, non-slip upper surface 40 that can be provided by surface embossments, a roughened surface such as by sand blasting, or by adhering strips or other shapes of high-friction materials thereto. The plate can be stainless steel, in order to minimize rusting, or it can be of a non-ferrous material, such as aluminum alloy with suitable supporting ribs positioned on the lower surface thereof.

In operation, plate 24 is normally in the position shown in solid lines in FIG. 1, to provide a continuous, flat, uninterrupted sidewalk surface. When it is desired that the ramp be placed in elevated position, as shown in dashed lines in FIG. 1, electric power is supplied to motor 54 to rotate shaft 56 and cause drive pinion 58 to urge rack 48 in an upward direction along inclined slot 50 to push the front portion of plate 26 upwardly. When plate 26 has reached its uppermost position, lip 42 is received in slot 22 of channel 20, to thereby prevent additional upward movement of the plate. The plate can be maintained in its elevated position by means of a braking means, such as motor braking device 56a, that locks motor shaft 56 in a nonrotatable position when the motor is not operating to raise or lower the ramp. Alternatively, an electrically releasable clamp or brake (not shown) can be arranged to grip rack 48 when motor 54 is not energized, and to release its grip when the motor is energized to raise or lower the ramp.

Another embodiment of the present invention is illustrated in FIGS. 3 and 4, in which corresponding parts are identified with the same reference numerals as in the embodiment illustrated in FIGS. 1 and 2. In the arrangement shown in FIG. 3, rack 48 is positioned for vertical movement, to cause front edge 30 of plate 26, together with lip 42, to move in a vertical direction along the vertical edge of riser 19 until lip 42 engages slot 22 in the channel. In this embodiment, instead of a fixed pivot at the rear edge 28 of plate 26 as in connection with the FIG. 1 embodiment, plate 26 is of similar configuration, but the ends of pivot shaft 32 are rotatably and slidably received in respective elongated channels 60 that are placed in the respective opposite sides of recess 24, as shown in FIG. 4. Each channel includes an elongated slot 62 corresponding in width with the diameter of pivot shafts 32 in order to permit rear edge 28 of plate 26 to move toward step 14 to the extent necessary, while still retaining the pivot shafts for rotation. The linear movement of pivot shafts 32 from point A when the plate is a position flush relative to the sidewalk, to point B, when the plate is inclined as shown in dashed lines in FIG. 3, results in a very small gap between rear edge 28 of plate 26 and the corresponding edge of recess 24. In all other respects, the operation of the embodiment shown in FIG. 3 is the same as that of the embodiment shown in FIG. 1.

Figures 5, 6:
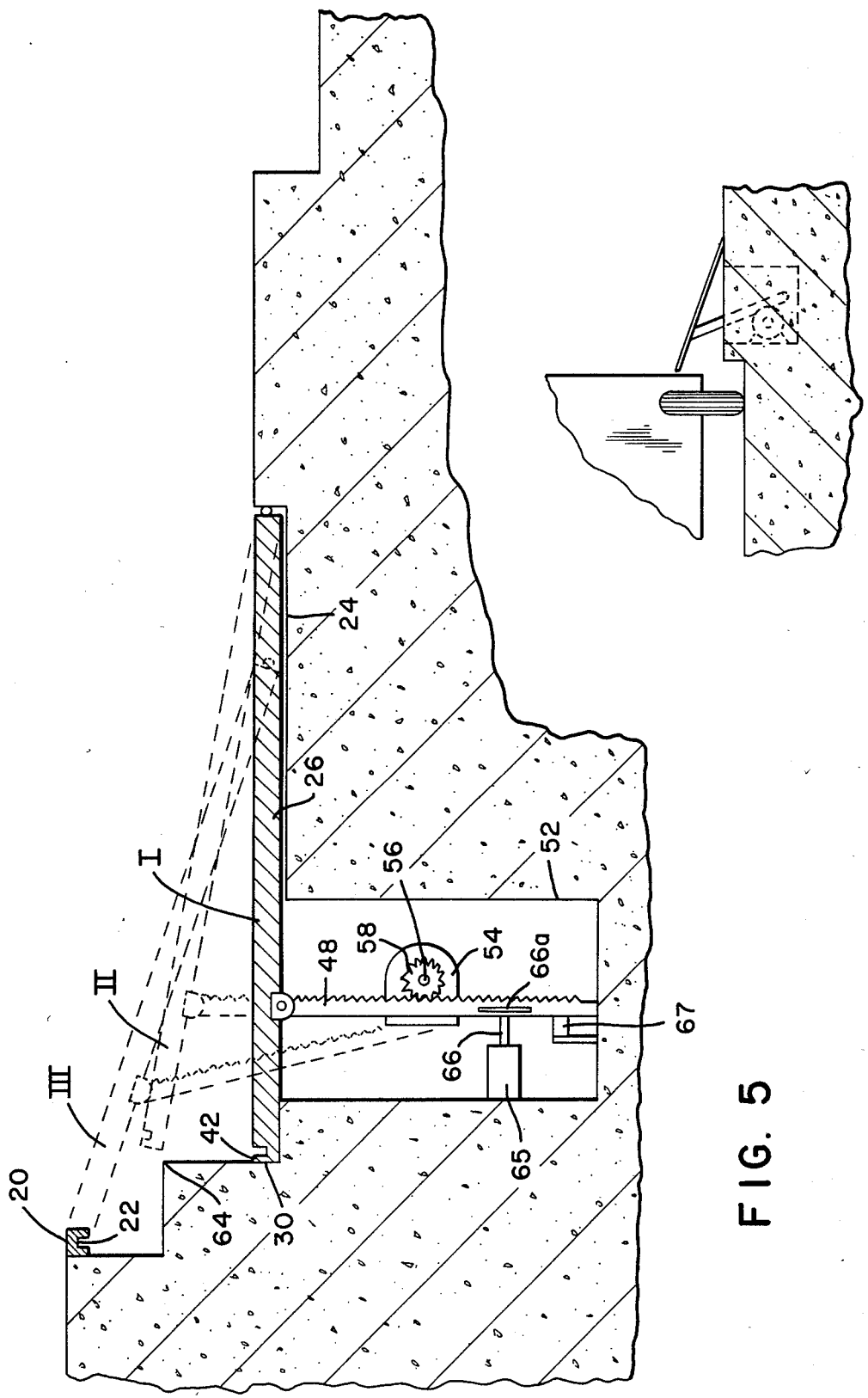
FIG. 5 is a fragmentary, cross-sectional view of still another embodiment of a wheelchair ramp in accordance with the present invention, and adapted for use where multiple steps are involved.
FIG. 6 is a fragmentary, cross-sectional view of a wheelchair ramp in accordance with the present invention and used to facilitate access to a transit vehicle.

Referring now to FIG. 5, there is shown another embodiment of the present invention which is adapted for use where multiple steps or transit vehicles are involved. In this embodiment, as in the embodiment illustrated in FIGS. 3 and 4, recess 24 includes a pair of channels 60 along the larger opposite edges thereof, as illustrated in FIG. 4, in order to permit rear edge 28 of plate 26 to move toward the steps as front edge 30 thereof is being elevated. As shown in FIG. 5, in the course of its elevation, front edge 30 of plate 26 is moved upwardly a distance sufficient to permit it to clear the edge 64 of the first step, whereupon rack 48 is caused to tilt toward the steps to permit lip 42 of plate 26 to engage with slot 22 in channel 20, which in this embodiment is placed at the upper edge of the uppermost step. Thus, plate 26 is initially in the position I shown in solid lines in FIG. 5. It is then elevated to a second position II shown in dashed lines, and then to its ultimate, uppermost position III, as also shown in dashed lines. In this embodiment, suitable means are provided to cause the rack to tilt toward the steps, which permits the plate to move both upwardly and forwardly and allows engagement of lip 42 with slot 22. The tilting means includes a sensor switch 67 to detect the movement of the rack the distance needed to achieve position II. Switch 67 energizes a solenoid 65 to push pin 66 perpendicular to and toward rack 48. Pin 66 extends into an elongated channel 66a formed in the side of rack 48. The movement of pin 66 toward rack 48 tilts the rack through the required angle to permit the ramp to be moved forwardly and upwardly to position III.

FIG. 6 shows another application of the embodiment of FIG. 5 suitable for use with transit vehicles such as buses, streetcars, and railway cars. In this application the ramp is positioned in the sidewalk adjacent to the curb and is adapted to move upwardly and outwardly from the curb to engage with the uppermost step of the vehicle.

Although particular embodiments of the present invention have been illustrated and described, it will be apparent to those skilled in the art that various changes and modifications can be made without departing from the spirit and scope of the present invention, and it is intended to cover in the appended claims all such changes and modifications that fall within the scope of the present invention.

What is claimed is:

1. A pivotable ramp to permit a wheeled vehicle to travel between a lower level and an upper level separated by at least one step, said ramp comprising:

(a) a generally rectangular plate having pivot means at a first end thereof to define a pivot axis, said plate having an upwardly facing surface and an upwardly extending lip at a second end thereof spaced from and opposite to said first end, and an upwardly opened groove in the upwardly facing surface of said plate rearwardly of said lip at said second end and adjacent said lip;

(b) retainer means positioned on said lower level to rotatably retain said pivot means;

(c) grooved lip receiving means positioned adjacent the upper edge of a step for receiving said lip of said rectangular plate; and (d) means to elevate said plate about said pivot axis between a first position below said step and parallel to said lower level, and a second position wherein said plate is inclined relative to said first position and said second end is adjacent to said upper level, said lip engaging with said lip receiving means when said plate is in said second position, said lip receiving means preventing pivoting of said plate beyond said upper level to provide an inclined ramp extending from said lower level to said upper level.

2. The ramp of claim 1 wherein said retainer means is fixed in position.

3. The ramp of claim 1 wherein said plate includes a downwardly facing surface, the upwardly facing surface having a high friction coefficient.

4. The ramp of claim 1 wherein said lip receiving means comprises a channel secured to the forward edge of said step, said channel including a downwardly facing slot.

5. The ramp of claim 1 wherein said pivot means includes a single shaft secured to said plate.

6. The ramp of claim 1 were in said pivot means includes a pair of coaxial, outwardly extending pivot pins positioned at said first end of the plate.

7. The ramp of claim 1 wherein said means to elevate said plate includes a slidable rack having one end positioned against said plate, a pinion gear in engagement with said rack and means to rotate said pinion gear, whereby the rotation of said pinion gear causes said rack to move said plate toward or away from said first position to selectively raise or lower said plate relative to said step.

8. The ramp of claim 7 wherein said retainer means includes an elongated groove to permit said pivot means to be movable toward and away from said step, and said means to elevate said plate includes means to tilt said rack toward said step to cause said plate to move toward said lip receiving means while it is being elevated.

9. The ramp of claim 9 including sensing means for sensing the distance said rack has moved and for providing an output signal when the rack has moved a predetermined distance, and means responsive to said output signal to actuate said tilting means.

10. A pivotable ramp to permit a wheeled vehicle to travel between a lower level and an upper level separated by at least one step, said ramp comprising:

(a) a generally rectangular plate having pivot means at a first end thereof to define a pivot axis, and an upwardly extending lip at a second end thereof spaced from and opposite to said first end;

(b) retainer means positioned on said lower level to rotatably retain said pivot means, wherein said retainer means includes an elongated groove to permit said pivot means to be movable toward and away from said step;

(c) grooved lip receiving means positioned adjacent the upper edge of a step; and (d) means to elevate said plate about said pivot axis between a first position below said step and parallel to said lower level, and a second position wherein said plate is inclined relative to said first position and said second end is adjacent to said upper level, said lip engaging with said lip receiving means when said plate is in said second position, said lip receiving means preventing pivoting of said plate beyond said upper level to provide an inclined ramp extending from said lower level to said upper level.

* * * * *